Mar. 3, 1925.
W. A. LAYCOCK ET AL
1,528,116
CIRCUIT MAKER AND BREAKER
Filed June 3, 1922
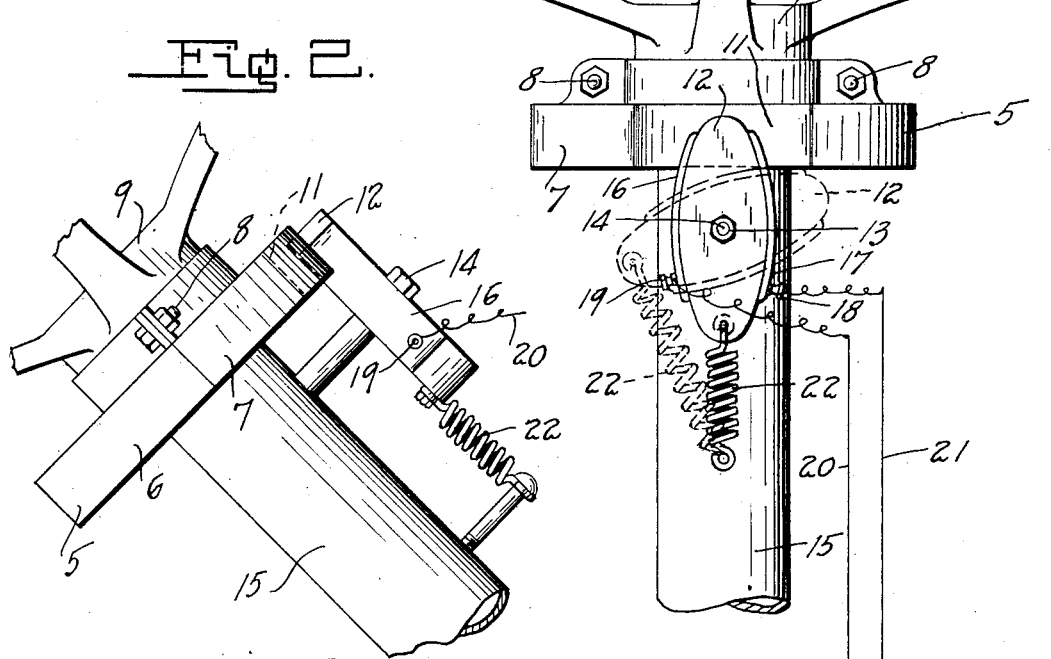
Inventors
W. A. Laycock
W. J. Walsh
By Watson E. Coleman
Attorney Patented Mar. 3, 1925.

1,528,116

UNITED STATES PATENT OFFICE.

WILBUR AUSTIN LAYCOCK AND WILLIAM J. WALSH, OF DELTA, COLORADO; SAID LAYCOCK ASSIGNOR TO MOTOR CURVE LIGHT COMPANY, OF DELTA, COLORADO, A CORPORATION OF COLORADO.

CIRCUIT MAKER AND BREAKER.

Application filed June 3, 1922. Serial No. 565,569.

*To all whom it may concern:*

Be it known that we, WILBUR AUSTIN LAYCOCK and WILLIAM J. WALSH, citizens of the United States, residing at Delta, in the county of Delta and State of Colorado, have invented certain new and useful Improvements in Circuit Makers and Breakers, of which the following is a specification, reference being had to the accompanying drawings.

This invention relates to circuit makers and breakers and more particularly to circuit makers and breakers for the lighting systems of automobiles.

It is an object of the invention to provide a device of this character which is automatic in its operation upon operation of the steering wheel in the usual manner to change the direction of travel of the automobile.

It is another object of the invention to provide a device of this character including a contact member carried by the steering wheel and a contact member carried by the steering post, said members being spaced from each other when the vehicle is traveling straight ahead and arranged to contact with each other upon turning of the vehicle in either direction.

It is also an object of the invention to provide a device of this character, a portion of which is carried by the steering wheel and a portion movably mounted on the steering post, each of said portions being arranged to engage each other upon movement of the steering wheel in either direction, without interfering with or limiting the movement of the steering wheel.

It is a further object of the invention to provide a device of this character including a stationary contact carried by the wheel of the vehicle, and a movable contact carried by the steering post of the vehicle, the movable contact being normally maintained in a vertical position, with means normally resisting movement of the movable contact away from the stationary contact and for holding the movable contact in engagement with the stationary contact upon movement of the wheel.

With these and other objects in view the invention consists in the improved construction and arrangement of parts to be hereinafter more particularly described, fully claimed and illustrated in the accompanying drawings, in which:—

Figure 1 is a fragmentary elevation of a steering post and wheel showing the invention applied, the operative position of the movable contact being shown in dotted lines;

Figure 2 is a fragmentary side elevation of the structure shown in Figure 1; and Figure 3 is a sectional top plan view.

Referring to the drawings, 5 designates a contact member, said member comprising sections 6 and 7 which are substantially arcuate, the end portions of said sections being extended substantially upwardly and provided with openings for the reception of fastening means 8. The sections 6 and 7 are adapted to surround the hub portion 9 of the steering wheel 10 and are firmly clamped to said portion by the fastening means 8 so as to remain stationary with respect to the wheel, but movable with respect to the steering post. The section 7 has a portion of its edge cut away at the central portion of said section to provide an arcuate recess 11. In the application of the contact plate 5 to the steering post the same is positioned so that the recess 11 is disposed directly in front of the driver when the steering gear is positioned for travel straight ahead. The contact plate 5 is grounded to the machine through the medium of the steering mechanism and thereby forms one terminal of the circuit maker and breaker.

The other terminal of the circuit maker and breaker comprises an arm 12 constructed of insulating material, said arm being substantially oblong in shape and having an opening 13 in its central portion for the reception of a pivot pin 14 carried by the steering post 15 of the steering mechanism. The arm 12 is movable with respect to the steering post as well as with respect to the contact plate 5 and steering wheel 10. Secured to the longitudinal edges of the arm 12 and insulated from each other by said arm are metallic plates 16 and 17, binding posts 18 and 19 being carried by the lower end portions of the plates to which wires 20 and 21 are connected. The upper end portion of the arm 12 is adapted to be normally disposed in the recess 11 provided in the section 7 of the contact plate 5, and in view of the size of the arm and said recess, is normally spaced from all portions of the recess so as to hold the circuit open. To prevent accidental contact of the upper end portion of the arm 12 with the contact plate 5, a spring 22 is connected at one end to the lower end of the arm 12 and at its opposite end to the steering post of the vehicle. By this means the arm 12 is substantially held in alignment with the steering wheel. The wires 20 and 21 are intended to extend to lamps 23 and 24 which may be positioned at any point on the automobile according to the requirements of the user, for instance, they may be spotlights positioned on the windshield or lights placed in the reflectors of the headlights or upon the frame of the automobile beneath the headlights, the lights being placed so that the rays will cross each other to illuminate the curved path of travel, for instance, to illuminate the road when turning a corner during which time the main headlights' rays are projected straight ahead. The position of the lights will not interfere with the operation of the circuit maker and breaker.

In the operation of the device when the automobile is traveling straight ahead the arm 12 is positioned within the recess 11 in spaced relation to the edges of said recess, as above described. Upon turning of the automobile either to the right or to the left one portion of the edge of the recess will come in contact with one of the plates carried by the arm 12 thereby closing the circuit through the lamps positioned to illuminate the curved path of travel. Continued movement of the steering wheel will cause the arm 12 to be turned to a horizontal position beneath the contact plate 5, continued movement of the plate closing the circuit in view of the fact that the upper end portion of the plate 16 or 17 is urged into contact with the contact plate 5 through the medium of the spring tending to return the arm to a straight position with respect to the steering post.

Upon return movement of the steering wheel, the arm 12 upon reaching the recess 11 will be returned to its former position by means of the spring. The same operation occurs when the vehicle is turned in the opposite direction in that the remaining plate engages the bottom of the contact plate 5 and thus the circuit closed regardless of the degree of curvature or the amount of rotation of the steering wheel, and in view of the fact that the arm 12 insulates the plates 16 and 17 from each other, there is no possibility of both lamps being energized upon turning of the vehicle in one direction.

From the foregoing it will be readily seen that this invention provides a novel form of circuit maker and breaker capable of being readily applied by an unskilled person to any make of automobile so that auxiliary lamps may be used by means of which the entire bend or curvature in a road may be illuminated when the steering wheel is turned in the direction of the curve. All of these features are possessed by a device composed of a small number of simple parts which occupy a small space on the steering mechanism of the automobile.

What is claimed is:—

1. In combination with the steering mechanism of an automobile embodying a steering post and steering wheel, a contact plate carried by the steering wheel, said contact plate having a recess in one edge thereof, a contact arm pivoted to the steering post adjacent the plate, contact means carried by the edges of said arm and insulated from each other by the arm, one end portion of said arm being normally disposed in the recess of the contact plate in spaced relation to said plate, and means connecting the opposite end of the arm to the steering post for yieldably resisting movement of said arm by the plate upon movement of the steering wheel.

2. In combination with the steering mechanism of a vehicle embodying a steering post and a steering wheel mounted on the post, the post being stationary with relation to the steering wheel, an annulus of conducting material carried by the steering wheel and having a notch, an insulatory member pivoted intermediate its ends to the steering post adjacent the steering wheel and having one end thereof projecting into the notch of the annulus, a spring connecting the opposite end of the member and the steering post, and strips of conducting material disposed upon opposite side faces of said member.

In testimony whereof we hereunto affix our signatures.

WILBUR AUSTIN LAYCOCK.
WILLIAM J. WALSH.